United States Patent [19]

Jurrens

[11] 3,950,291

[45] Apr. 13, 1976

[54] HOT-MELT ADHESIVE COMPOSITION

[75] Inventor: Lawrence D. Jurrens, Bartlesville, Okla.

[73] Assignee: Phillips Petroleum Company, Bartlesville, Okla.

[22] Filed: June 3, 1974

[21] Appl. No.: 475,976

[52] U.S. Cl....... 260/23.7 R; 260/27 R; 260/27 BB; 260/878 B
[51] Int. Cl.² .......................................... C08L 91/00
[58] Field of Search ......... 260/27 R, 27 BB, 23.7 R, 260/878 B

[56] References Cited
UNITED STATES PATENTS

| | | | |
|---|---|---|---|
| 3,239,478 | 3/1966 | Harlan | 260/27 R |
| 3,325,430 | 6/1967 | Grasley | 260/27 BB |
| 3,632,540 | 1/1972 | Unmuth | 260/27 R |
| 3,649,579 | 3/1972 | Gobran | 260/27 R |

*Primary Examiner*—Donald E. Czaja
*Assistant Examiner*—William E. Parker

[57] ABSTRACT

Conjugated-diene based hot-melt adhesive compositions can be prevented from increasing in viscosity during heat aging by adding to the composition a sufficient amount of fatty acid, fatty acid containing material, glycerol ester of rosin, disproportionated rosin (dehydroabietic acid), modified rosin (40% dimeric resin acid), or mixtures thereof.

11 Claims, No Drawings

HOT-MELT ADHESIVE COMPOSITION

This invention relates to hot-melt adhesives. In another aspect, the invention relates to hot-melt adhesive of conjugated-diene polymers. In a further aspect, the invention relates to hot-melt adhesives that do not increase in viscosity during heat aging.

Adhesives can be categorized as solution, dispersion, emulsion, or hot-melt adhesives. This categorization is based upon the form in which the adhesive composition is applied to the materials to be bonded. With the hot-melt type adhesive, a composition, generally comprising a polymer and a tackifier, is heated until it becomes molten and this molten composition is applied to the material to be bonded. It has been discovered that many hot-melt adhesive compositions increase in viscosity while they are being maintained in a molten condition. As the adhesives become more viscous, they become more difficult to apply. Since hot-melt adhesives must often be maintained in a liquid state for at least a full day of operation it is desirable to work with adhesive compositions that do not increase in viscosity during heat aging.

It is an object of this invention to provide hot-melt adhesive compositions that do not increase in viscosity during the heat aging that necessarily accompanies the application of hot-melt adhesives. Another object is to provide a method for preventing hot-melt adhesive composition from increasing in viscosity upon heat aging. Another object is to provide a branched or radial rubber block polymer based hot-melt adhesive composition which does not increase in viscosity during heat aging.

Other aspects, objects and advantages of the invention will be apparent to those skilled in the art from a careful study of the disclosure and the appended claims.

In accordance with the invention, hot-melt adhesive compositions having improved aging characteristics are provided comprising a polymer of a conjugated diene which has a tendency to increase in viscosity during aging and, a stabilizing amount of at least one material selected from fatty acids, fatty acid-containing materials, glycerol esters of rosins, disproportionated rosins, and modified rosins which is sufficient to prevent the composition from increasing in viscosity during heat aging.

In accordance with another embodiment, it has been found that adhesives comprising polymers of butadiene having stable viscosity properties can be prepared by adding a viscosity stabilizing amount of at least one of the above-mentioned stabilizers to the adhesive compositions which can optionally contain normal tackifying resins or other additives.

In accordance with one presently preferred embodiment, pressure sensitive hot-melt adhesives which exhibit reduced melt viscosity upon aging are provided by incorporating a viscosity stabilizing amount of a combination of a tall oil rosin and a modified rosin ester into conjugated diene copolymer based adhesives.

In accordance with another preferred embodiment, the addition of a viscosity stabilizing amount of a fatty acid, such as stearic acid, and a modified rosin ester to a conjugated diene copolymer based adhesive provides pressure sensitive hot-melt adhesives which upon heat aging exhibit reduced, rather than increased, melt viscosity.

As indicated above, the amount of viscosity stabilizing material added to the conjugated diene-containing polymer based adhesive can vary somewhat depending upon the particular polymer being used and the particular stabilizer being added thereto. The amount incorporated into the adhesive composition is sufficient to prevent the hot-melt composition from increasing in viscosity during heat aging. Normally, the amount of viscosity stabilizing material added will range from 7 parts by weight to 300 parts by weight based upon 100 parts by weight of the diene polymer present in the adhesive composition. When the viscosity stabilizing material is a fatty acid the preferred range is 7 to 13 parts by weight. When the viscosity stabilizing material is other than a fatty acid the preferred range is 25 to 300 parts by weight.

Conjugated-diene polymers that are possible candidates for preparation of hot-melt adhesives include both homopolymers and copolymers. For example, homopolymers of 1,3-butadiene, isoprene, 2,3-dimethyl-1,3-butadiene, piperylene, 3-butyl-1,3-octadiene, 1-phenyl-1,3-butadiene and the like would be possible candidates for the polymer portion of the hot-melt adhesive. Likewise, various copolymers of the above mentioned monomers could be considered for use in hot-melt adhesives. Other suitable copolymers are those of conjugated diene and vinyl aromatic compounds, conjugated dienes and acrylonitrile, and butadiene and isobutylene. Of the butadiene based polymers, those considered to be particularly preferable for use in hot-melt adhesives are butadiene homopolymers and butadiene vinyl aromatic copolymers with a maximum of 50 percent by weight of polymer of vinyl aromatic component. Naturally, the conjugated-diene polymers selected would only include those which have the inherent characteristics such as coherency which those skilled in the art recognize as suitable for the preparation of a hot-melt adhesive.

Butadiene copolymers that are especially suitable for the preparation of hot-melt adhesives are block copolymers having the general configuration

A-B-A wherein the polymer blocks A are plastic polymer blocks which, as homopolymers have glass transition temperatures above 20°C, while the center elastomeric polymer blocks are derived from at least one conjugated diene such as butadiene or isoprene.

The non-elastomeric end blocks may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, ethyl vinyl benzene as well as dicyclic monovinyl compounds such as vinyl naphthalene and the like. Other non-elastomeric terminal polymer blocks may be derived from alpha olefins, alkylene oxides, acetals, urethanes, etc.

The center elastomeric blocks are prepared from conjugated dienes such as isoprene, butadiene, copolymers of styrene and butadiene as well as their homologues. Copolymeric center blocks contain at least 60 weight percent conjugated diene.

While the specific molecular weight of the center block prepared from the conjugated diene and the plastic terminal blocks may be varied for specific end uses, it is preferred that the elastomeric center blocks have an average molecular weight from about 15,000 to about 250,000 (more particularly 25,000–150,000) and that the terminal plastic blocks prepared from vinyl arene comprise 5–50 percent by weight of the entire block copolymer, the individual molecular weights of these terminal plastic blocks being coordinated for this purpose with the average molecular weight of the center elastomeric block.

The terminal blocks are those having average molecular weights between about 5,000 and 125,000, preferably 15,000–100,000. These terminal blocks are prepared by polymerization of vinyl monomers and/or acrylic monomers and should preferably have glass transition temperatures above about 50°C, the difference in glass transition temperature between that of the center block and of the end blocks being preferably greater than about 100°C.

A description of the preparation of the A-B-A block copolymer is contained in U.S. Pat. No. 3,239,478.

Another butadiene copolymer has been found to be especially suitable for the preparation hot-melt adhesive — the branched or radial copolymer having the formula $(A-B)_xY$ wherein A represents non-elastomeric polymer blocks, or segments, and B represents elastomeric polymer segments. Y is an atom or group of atoms derived from a polyfunctional treating agent used in the formation of the radial polymers, and $x$ is an integer of at least 3 and can be equal to the number of functional groups of said polyfunctional treating agent.

The radial block polymer thus can be characterized as having at least three polymer branches with each branch of the radial block polymer comprising terminal non-elastomeric segments. The branches of the radial block polymer contain a terminal non-elastomeric segment attached to an elastomeric polymer segment.

The non-elastomeric polymer blocks in the radial copolymer may comprise homopolymers or copolymers of vinyl monomers such as vinyl arenes, vinyl pyridines, vinyl halides and vinyl carboxylates, as well as acrylic monomers such as acrylonitrile, methacrylonitrile, ester of acrylic acids, etc. The vinyl arene monomers include particularly styrene, 1-vinylnaphthlene, 2-vinylnapthtalene and the alkyl, cycloalkyl, aryl, alkaryl and aralkyl derivatives thereof in which the total number of carbon atom in the combined constituents is general not greater than 12. Examples of such substituted monomers include: 3-methylstyrene, 4-n-propylstyrene, 4-cyclohexylstyrene, 4-dodecylstyrene, 2-ethyl-4-benzylstyrene, 4-p-tolystyrene, 4-(-phenyl-n-butyl) styrene, and the like. Other non-elastomeric terminal polymer blocks may be derived from alpha olefins, alkylene oxides, acetals, urethanes, etc.

The conjugated dienes used in the production of the elastomeric block of the radial copolymers to be used in preparing hot-melt adhesives are those which contain from 4 to 8 carbon atoms. Examples of such compounds include 1,3-butadiene, isoprene, 2,3-dimethyl-1,3-butadiene, piperylene, 3-butyl-1,3-octadiene, 1-phenyl-1,3-butadiene and the like.

The amount of conjugated dienes present in the branched block copolymer can be from 50 to 95 parts by weight per 100 parts of the branched block copolymer. The vinyl-substituted aromatic compound can be present in the range of from 5 to 50 parts by weight per 100 parts of the branched block copolymer.

The elastomeric blocks or segments of the polymer can be a homopolymer of a conjugated diene, copolymers of two or more conjugated dienes, or copolymers of one or more monovinyl-substituted aromatic hydrocarbons. The latter elastomeric block or segment contains at least about 60 percent by weight of said conjugated diene based on the composition of the elastomeric block.

The radial block copolymer contains elastomeric segments which comprise from about 50 to 95 percent by weight of the total polymer composition, and the terminal non-elastomeric blocks comprise about 5 to 50 weight percent of the total polymer composition. Accordingly, each terminal non-elastomeric block of the radial block copolymer comprises a homopolymer of a monovinyl-substituted aromatic hydrocarbon, copolymers of two or more of said vinyl aromatic hydrocarbons, or copolymers of said monovinyl-substituted aromatic hydrocarbon and a conjugated diene which contain at least 80 percent by weight of said monovinyl-substituted aromatic hydrocarbon based on the weight of said non-elastomeric segment. Generally, each non-elastomeric polymer segment of the radial block polymer comprises at least 5 weight percent of the total weight of the radial block polymer.

The amount of vinyl-substituted aromatic compound present as terminal polymer blocks in a preferred type of radial block copolymers is at least 5 parts by weight of the vinyl-substituted aromatic compound present in terminal blocks for every 100 parts by weight of the branched block copolymer. While it is preferable that the terminal polymer blocks on the branched block copolymer be homopolymer blocks of the vinyl-substituted aromatic compound, it is also within the scope of this invention to utilize branched block copolymers with terminal polymer blocks that are predominantly vinyl-substituted aromatic polymers with minor amounts of the conjugated diene monomer units. When the terminal polymer blocks are composed both of vinyl-substituted aromatic units and conjugated diene units, the conjugated diene comprises less than 20 parts by weight for each 100 parts by weight of the terminal polymer block, with the vinyl-substituted aromatic comprising the remainder.

The radial block polymers employed in accordance with this invention can be prepared by conventional methods known to the art. Examples of such method are disclosed in U.S. Pat. No. 3,281,383, issued to Zelinski et al., Oct. 25, 1966, the disclosure of which is herein incorporated by reference.

While conjugated-diene polymers comprise the principal and sometimes sole elastomeric component of these hot-melt adhesive compositions, they may be mixed with minor proportions of other ordinary elastomers such as natural rubber, synthetic neoprene, polybutylenes, ethylene propylene rubbers, etc.

In accordance with the present invention, conjugated-diene polymer, based hot-melt adhesive compositions that do not increase in viscosity during heat aging can be obtained by employing in combination with the polymer a sufficient amount of fatty acid, fatty acid containing material, unmodified glycerol ester of rosin, disproportionated rosin (dehydroabietic acid), modified rosin (40% dimeric resin acid), or mixtures thereof.

The fatty acids that may be used are generally those with 4 to 50 carbon atoms. Preferably, the fatty acids have from 6 to 36 carbon atoms. Especially preferable fatty acids are stearic acid, palmitic acid, and oleic acid.

A preferred form of fatty acid containing material is rosin. Rosin consists mainly of rosin acids and smaller amounts of rosin acid esters, rosin anhydrides, unsaponifiable material, and fatty acids. Tall oil rosin, wood rosin, and gum rosin are examples of specific types of rosin that may be used in this invention.

A commerically available unmodified glycerol ester of rosin is "Zonester 85", a glycerol ester of tall oil rosin. A commerically available disproportionated rosin (dehydroabietic acid) is "Resin 731D". A commercially available modified rosin containing 40% dimeric resin acids is "Polypale Resin".

In most conjugated-diene based hot-melt adhesives a tackifying resin is employed in combination with the polymer to enhance the tack of the composition. Tackifiers may also be used in conjunction with the viscosity stabilizing materials of this invention. Since some of the viscosity stabilizing materials can function as tackifying agents, additional tackifying resins may, however, not be necessary. Commonly known tackifying resins that may be employed in combination with the viscosity stabilizing materials are represented by rosin, rosin derivatives, polyterpene resins, thermoplastic phenolic resins, rosin esters, partial esters of styrene — maleic acid copolymers, chlorinated biphenyls, coumarone-indene resin, and the like.

Examples of commercially available tackifiers include: "Ester 3" triethylene glycol ester of hydrogenated rosin and "Ester 10" glycerol ester of hydrogenated rosin, "Foral 85" and "Foral 105" highly stabilized ester resins, "Hercolyn D" hydrogenated methyl ester of rosin purified by steam distillation, and "Pentalyn H" pentaerythritol ester of hydrogenated rosin. The tackifying resins are used in amounts necessary to provide the desired degree of tack. Generally the amount of tackifier present in a hot-melt composition is 25 to 400 parts by weight for every 100 parts by weight of polymer.

The conjugated diene polymer based hot-melt adhesive composition may in addition contain conventionally known antioxidants and heat stabilizers that will protect the polymers against degradation during preparation and use of the adhesive composition. Combinations of stabilizers are often more effective, due to the different mechanisms of degradation to which various polymers are subject. Certain hindered phenols, organo-metallic compounds, aromatic amines and sulfur compounds are useful for this purpose. Especially effective types of these materials include the following:
1. Benzothiazoles, such as 2-(dialkyl-hydroxybenzyl-thio) benzothiazoles
2. Esters of hydroxybenzyl alcohols, such as benzoates, phthalates, stearates, adipates or acrylates of 3,5-dialkyl-4-hydroxybenzyl alcohols,
3. Stannous phenyl catecholates,
4. Zinc dialkyl dithiocarbamates,
5. Alkyl phenols, e.g., 2,6-di-tert-butyl-4-methyl phenol,
6. dilaurylthio-dipropionate.

Examples of commercially available antioxidants are "Ionox 220" 4,4-methylene-bis(2,6-di-t-butyl-phenol) and "Ionox 330" 3,4,6-tris(3,5-di-t-butyl-p-hydroxybenzyl)-1,3,5-trimethylbenzene, "Dalpac 4C" 2,6-di(t-butyl)-p-cresol, "Naugawhite" alkylated bisphenol, "Butyl Zimate" zinc dibutyl dithiocarbamate, and "Agerite Geltrol" alkylated-arylated bis-phenolic phosphite. From about 0.01 percent to about 5.0 percent by weight of one or more antioxidants is generally added to the hot-melt adhesive composition.

The hot-melt adhesive composition may also be modified by the use of extender oils such as taught in U.S. Pat. No. 3,239,478, or by the use of solid resinous polyterpene as taught in U.S. Pat. No. 3,736,281.

The hot-melt adhesive compositions of this invention may be prepared either by blending the components in a volatile solvent such as toluene and then removing the solvent or by mixing the components at a temperature between 350° to 450°F, usually about 350° to 400°F.

When it is desired to use the composition as an adhesive, it is simply melted and applied at about 350°F. For use in bonding substrates the adhesive composition is generally coated on the substrate in coatings 1 to about 5 mils thick, preferably 2 to 4 mils thick.

The following examples are set forth to illustrate a preferred embodiment of the invention and are not to be considered as limiting the scope of the invention.

EXAMPLE I

The following comparative runs A and B and inventive run C employed a commercial oil extended (50 phr) 60/40 butadiene/styrene radial block copolymer prepared using silicon tetrachloride as coupling agent with a weight average molecular weight of 160,000.

The adhesive compositions were formulated by incremental addition of "Foral 85", a highly hydrogenated glycerol ester of rosin acid with a softening point of about 82°C, or "Acintol R", a tall oil rosin, and polymer to a preheated (375°F) one-quart Baker-Perkins mixer. On complete addition of tackifier and polymer, the stabilizer system consisting of 1 phr (part by weight per one hundred parts by weight rubber) dilauryl thiodipropionate and 4 phr Agerite Geltrol (R. T. Vanderbilt Co., Inc.), an alkylated-arylated bis-phenolic phosphite, was added. With the exception of run A the blends were allowed to mix for one hour under a nitrogen atmosphere. Removal of the composition from the mixer was accomplished while it was in the molten state. Difficulty in mixing was encountered with run A. It was necessary to mix that composition for two hours to obtain a sufficient blending.

Melt viscosity was measured at 350°F in centipoise on the compositions (original and aged 24 hours at 350°F) using a Brookfield Thermosel viscometer equipped with a no. 4-27 spindle.

Table I gives the amounts of oil extended rubber and additive and the melt viscosities of the original and aged compositions.

Table I

| Run | Rubber, gm. | Additive | gm | Melt Viscosity ×10³cps Orig. | Aged | % Change |
|---|---|---|---|---|---|---|
| A | 100 | Foral 85 | 100 | 91.25 | 94 | 3 |
| B | 100 | Foral 85 | 100 | 360 | 452.5 | 26 |

Table I-continued

| Run | Rubber, gm. | Additive | gm | Melt Viscosity ×10³cps Orig. | Aged | % Change |
|---|---|---|---|---|---|---|
| C | 100 | Acintol R | 100 | 167.5 | 42 | −76 |

Inventive run C employing tall oil rosin shows a decrease in melt viscosity on heat aging compared to the increases observed in comparative runs A and B. The difference between the original melt viscosity in runs A and B is a result of the longer mix time for run A.

EXAMPLE II

The following comparative run D and inventive runs E and F employed a 70/30 butadiene styrene radial block copolymer prepared using silicon tetrachloride as coupling agent with a weight average molecular weight of 95,000.

The adhesive compositions were formulated and tested as described in Example I. Amounts of rubber and additive (modified rosin ester or tall oil rosin) and test results are given in Table II.

Table II

| Run | Rubber, gm | Additive | gm | Melt Viscosity ×10³cps Orig | Aged | % Change |
|---|---|---|---|---|---|---|
| D | 100 | Foral 85 | 100 | 26 | 35.5 | 38 |
| E | 100 | Acintol R | 100 | 13.8 | 9 | −36 |
| F | 100 | Acintol R | 200 | 5 | 2.7 | −46 |

Inventive runs E and F employing tall oil rosin show decreases in melt viscosity on heat aging compared to comparative run D which shows an increase.

EXAMPLE III

The following runs employed a 70/30 butadiene/styrene radial block copolymer prepared using silicon tetrachloride as a coupling agent. The average molecular weight was 148,000. Comparative run G employed a Foral 85, modified rosin ester, Cumar LX509, a p-coumarone indene resin, and a naphthenic oil. In inventive runs H and I the modified rosin ester was replaced with an unmodified glycerol ester of tall oil rosin and stearic acid, respectively. Mixing and testing were as in Example I. The ingredients and test results are given in Table III.

Table III

| Run No. | Rubber, gm. | Additive | gm | Melt Viscosity ×10³cps Orig | Aged | % Change |
|---|---|---|---|---|---|---|
| G | 100 | Foral 85 | 100 | 9.5 | 10.1 | 6 |
|  |  | Cumar LX509 | 40 |  |  |  |
|  |  | Shellflex 371 | 60 |  |  |  |
| H | 100 | Zonester 85 | 100 | 12.8 | 10 | −22 |
|  |  | Cumar LX509 | 40 |  |  |  |
|  |  | Shellflex 371 | 60 |  |  |  |
| I | 100 | Stearic Acid | 10 | 10.2 | 7 | −31 |
|  |  | Cumar LX509 | 40 |  |  |  |
|  |  | Shellflex 371 | 60 |  |  |  |

Inventive runs H and I exhibit a decrease in melt viscosity on heat aging whereas comparative run G shows a slight increase.

EXAMPLE IV

The following runs employed a rubbery polymer of the same composition as that in Example III (70/30 butadiene/styrene radial block copolymer coupled with silicon tetrachloride) but with 167,000 molecular weight. Comparative runs J and L utilized a modified rosin ester as tackifier. Inventive runs K and M employed tall oil rosin alone or in combination with the modified rosin ester. Mixing and testing were as in Example I. Ingredients and test results are given in Table IV.

Table IV

| Run No. | Rubber, gm. | Additive | gm | Melt Viscosity ×10³cps Orig | Aged | % Change |
|---|---|---|---|---|---|---|
| J | 100 | Foral 85 | 100 | 222.5 | 500 | 125 |
| K | 100 | Acintol R | 100 | 141 | 55 | −61 |
| L | 80 | Foral 85 | 120 | 97.5 | 331.5 | 240 |
| M | 80 | Foral 85 | 60 | 59.5 | 34 | −43 |
|  |  | Acintol R | 60 |  |  |  |

Inventive runs K and M employing tall oil rosin exhibited reduced melt viscosity on heat aging compared to comparative runs J and L which showed increased melt viscosity.

EXAMPLE V

The following runs employed a 75/25 butadiene/styrene radial block copolymer coupled with silicon tetrachloride and with a molecular weight of 94,000. Comparative runs N and P employed modified rosin ester and run Q a polymer of mixed olefins. Inventive runs O and R T utilized commercially available rosins instead of the modified rosin ester. In runs U–W stearic acid was added along with the modified rosin ester commercially available as Foral 85. Mixing and testing were as in Example I. Ingredients and test results are in Table V.

Inventive runs Z and CC showed decreased melt viscosity on heat aging compared to the comparitive runs which showed an increase.

Table V

| Run No. | Rubber, gm. | Additive | gm | Melt Viscosity ×10³cps Orig | Aged | % Change |
|---|---|---|---|---|---|---|
| N | 100 | Foral 85 | 200 | 9.3 | 9.3 | 0 |
| O | 100 | Acintol R | 200 | 4.7 | 3.2 | −32 |
| P | 100 | Foral 85 | 100 | 22 | 40.2 | 83 |
| Q | 100 | Super Sta Tac 80 | 100 | 21.5 | 27.5 | 28 |
| R | 100 | Acintol R | 100 | 15.3 | 10.3 | −33 |
| S | 100 | WW Wood Rosin | 100 | 20 | 10.8 | −46 |
| T | 100 | Resin 731D | 100 | 17.8 | 16.5 | −7 |
| U | 100 | Foral 85 Stearic Acid | 100 5 | 15.7 | 17.8 | 13 |
| V | 100 | Foral 85 Stearic Acid | 100 10 | 19.7 | 17 | −14 |
| W | 100 | Foral 85 Stearic Acid | 100 15 | 14 | 21 | 50 |

Comparative runs P and Q show increases in melt viscosities whereas inventive runs O and R through T show decreases in melt viscosity. While no change in viscosity was observed in comparative run N, it is important to note there is an increase when lower loading of modified rosin ester is employed, whereas even at such comparable lower loadings the additives in Runs R, S, and T show decreases. Comparison of runs P, U, V and W shows that stearic acid is also effective in preventing the hot melt adhesive from increasing in viscosity.

EXAMPLE VI

The following runs employed a 80/20 butadiene/styrene radial block copolymer coupled with silicon tetrachloride and with a molecular weight of 101,000. Comparative runs X and AA employ commercially available modified rosin ester and comparative runs Y and BB employed a commercially available polymer of mixed olefins. Inventive runs Z and CC employed tall oil rosin. Mixing and testing were as in Example I. Ingredients and test results are in Table VI.

Table VI

| Run No. | Rubber, gm | Additive | gm | Melt Viscosity ×10³cps Orig | Aged | % Change |
|---|---|---|---|---|---|---|
| X | 100 | Foral 85 | 200 | 9 | 9.5 | 6 |
| Y | 100 | Super Sta Tac 80 | 200 | 9.5 | 10.7 | 13 |
| Z | 100 | Acintol R | 200 | 6 | 3.5 | −42 |
| AA | 100 | Foral 85 | 100 | 34.5 | 68.6 | 99 |
| BB | 100 | Super Sta Tac 80 | 100 | 24.4 | 39 | 60 |
| CC | 100 | Acintol R | 100 | 18.2 | 12.4 | −32 |

EXAMPLE VII

The following runs employed a rubber of the same composition as that in Example VI but with 173,000 to 175,000 molecular weight. Comparative run DD employed a modified rosin ester as tackifier. Run EE employed a hydrogenated rosin with an acid number of 165 and a saponification number of 167. Mixing and testing were as in Example I. Ingredients and test results are in Table VII.

Table VII

| Run No. | Rubber, gm | Additive | gm | Melt Viscosity ×10³cps Orig | Aged | % Change |
|---|---|---|---|---|---|---|
| DD | 80 | Foral 85 | 120 | 50.3 | 96.6 | 92 |
| EE | 80 | Staybelite Resin | 120 | 32.3 | 35.6 | 10 |
| FF | 80 | Polypale Resin | 120 | 51.2 | 30.6 | −40 |

Run FF containing a modified rosin of 40 percent dimeric resins acid prevented on increase whereas comparative runs DD and EE did not.

EXAMPLE VIII

The following runs employed a 85/15 butadiene/styrene radial block copolymer coupled using silicon tetrachloride and possessing a molecular weight of 175,000. Comparative runs GG and II employed a modified rosin ester alone or in combination with a p-coumarone-indene resin and a naphthenic oil. In runs HH and JJ tall oil rosin was used in place of the modified rosin ester. Mixing and testing were as in Example I. Ingredients and test results are in Table VIII.

Table VIII

| Run No. | Rubber, gm | Additive | gm | Melt Viscosity ×10³cps Orig | Aged | % Change |
|---|---|---|---|---|---|---|
| GG | 100 | Foral 85 | 100 | 206.25 | >500 | >143 |
| HH | 100 | Acintol R | 100 | 158.5 | 169 | 7 |
| II | 100 | Cumar LX509 Shellflex 371 | 40 60 | 22.9 | 29.5 | 29 |

Table VIII-continued

| Run No. | Rubber, gm | Additive | gm | Melt Viscosity ×10³cps Orig | Aged | % Change |
|---|---|---|---|---|---|---|
| JJ | 100 | Foral 85 | 100 | 21.5 | 16.5 | −23 |
| | | Cumar LX509 | 40 | | | |
| | | Shellflex 371 | 60 | | | |
| | | Acintol R | 100 | | | |

In run HH the composition did increase in viscosity. When this result is compared with the previous examples, it becomes clear that as the diene content of the polymer increases more tall oil rosin is required to prevent an increase in viscosity. In the composition of run JJ the tall oil rosin again prevented an increase in viscosity, whereas the composition containing a modified rosin ester increased in viscosity.

EXAMPLE IX

In the following runs the polymer base for the hot-melt adhesive was a 50/50 blend of a 60/40 butadiene/styrene radial block copolymer and a 75/25 butadiene/styrene linear block copolymer with a molecular weight of 83,000. Mixing and testing were as in Example I. Ingredients and test results are in Table IX.

Table IX

| Run No. | Rubber, gm | Additive | gm | Melt Viscosity ×10³cps Orig | Aged | % Change |
|---|---|---|---|---|---|---|
| KK | 100 | Acintol R | 100 | 50.3 | 40.6 | −24 |
| LL | 100 | Acintol R | 100 | 43 | 28.7 | −33 |
| MM | 100 | Acintol R | 200 | 11.2 | 6 | −46 |
| NN | 140 | Acintol R | 100 | 102 | 106.8 | 4 |
| OO | 140 | Acintol R | 150 | 40 | 35.8 | −12 |
| PP | 140 | Acintol R | 200 | 21.7 | 17 | −27 |
| QQ | 140 | Acintol R | 250 | 12.5 | 8.5 | −32 |
| RR | 140 | Foral 85 | 250 | 21.7 | 40.6 | 47 |

Runs KK through QQ illustrate that the tall oil rosin is effective for preventing an increase in viscosity when the polymer base includes a polymer other than a radial block copolymer. Also runs NN through QQ show that as the level of tall oil is increased it becomes more effective in preventing an increase in viscosity. Run RR shows that even at a high level the modified rosin ester does not prevent an increase in viscosity.

It will, of course, be understood that numerous modifications can be made in the ingredients, proportions, and conditions described in the foregoing examples without departing from the scope of this invention as disclosed hereinbefore and as defined in the claims which follow.

I claim:

1. The method of preventing an increase in viscosity during heat aging of a hot melt adhesive based on a radial block copolymer of at least one conjugated diene and at least one monovinyl-substituted aromatic hydrocarbon, said copolymer containing terminal non-elastomeric blocks and central elastomeric blocks wherein the ratio of conjugated diene to monovinyl aromatic is in the range of from 50/50 to 95/5 and wherein said radial block copolymer is of the formula $(A-B)_rY$ wherein A is a non-elastomeric polymer block, B is an elastomeric polymer block and Y is an atom or group of atoms derived from a polyfunctional compound having at least 3 reactive sites, and $x$ is an integer of at least 3, comprising adding to the hot melt adhesive a sufficient amount of a viscosity-stabilizing material comprising fatty acid, tall oil rosin, wood rosin, gum rosin, glycerol ester of rosin, disporportionated rosin (dehydroabietic acid), modified rosin containing 40 percent dimeric resin acid, or mixtures thereof.

2. The method of claim 1 wherein the viscosity-stabilizing material is a fatty acid having from 6 to 36 carbon atoms.

3. The method of claim 1 wherein the viscosity-stabilizing material is stearic acid.

4. The method of claim 1 wherein the viscosity-stabilizing material is tall oil rosin.

5. The method of claim 1 wherein the viscosity-stabilizing material is wood rosin.

6. A hot-melt adhesive composition having improved aging characterics comprising;
   a. a radial block copolymer of at least one conjugated diene and at least one monovinyl-substituted aromatic hydrocarbon, said copolymer containing terminal non-elastomeric blocks and central elastomeric blocks wherein the ratio of conjugated diene to monovinyl aromatic is in the range of from 50/50 to 95/5 and wherein said radial block copolymer is of the formula $(A-B)_rY$ wherein A is a non-elastomeric polymer block, B is an elastomeric polymer block and Y is an atom or group of atoms derived from a polyfunctional compound having at least 3 reactive sites, and $x$ is an integer of at least 3, and
   b. a viscosity-stabilizing material comprising fatty acid, tall oil rosin, wood rosin, gum rosin, glycerol ester of rosin, disproportionated rosin (dehyroabietic acid), modified rosin containing about 40 percent dimeric resin acid, or mixtures thereof, said viscosity-stabilizing material being present in an amount sufficient to prevent the hot-melt adhesive composition from increasing in viscosity during heat aging.

7. The composition of claim 6 wherein the viscosity-stabilizing material is a fatty acid having from 6 to 36 carbon atoms.

8. The composition of claim 7 wherein the fatty acid is stearic acid.

9. The composition of claim 6 wherein the viscosity-stabilizing material is gum rosin.

10. The composition of claim 9 wherein the rosin is tall oil rosin.

11. The composition of claim 9 wherein the rosin is wood rosin.

* * * * *